United States Patent
Nakama et al.

(12) 
(10) Patent No.: US 10,705,299 B2
(45) Date of Patent: Jul. 7, 2020

(54) FERRULE STRUCTURE, FERRULE STRUCTURE WITH FIBER, AND METHOD FOR MANUFACTURING FERRULE STRUCTURE WITH FIBER

(71) Applicant: FUJIKURA LTD., Tokyo (JP)

(72) Inventors: Akihiro Nakama, Chiba (JP); Shigeo Takahashi, Chiba (JP); Hirotaka Asada, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/348,821

(22) PCT Filed: Nov. 29, 2017

(86) PCT No.: PCT/JP2017/042744
§ 371 (c)(1),
(2) Date: May 9, 2019

(87) PCT Pub. No.: WO2018/101302
PCT Pub. Date: Jun. 7, 2018

(65) Prior Publication Data
US 2019/0265417 A1   Aug. 29, 2019

(30) Foreign Application Priority Data
Nov. 30, 2016   (JP) ................................ 2016-232508

(51) Int. Cl.
*G02B 6/38* (2006.01)
*G02B 6/32* (2006.01)

(52) U.S. Cl.
CPC .............. *G02B 6/382* (2013.01); *G02B 6/32* (2013.01); *G02B 6/38* (2013.01); *G02B 6/3847* (2013.01); *G02B 6/3853* (2013.01)

(58) Field of Classification Search
CPC .................................. G02B 6/382; G02B 6/38
See application file for complete search history.

(56) References Cited

U.S. PATENT DOCUMENTS

| 5,241,612 A | 8/1993 | Iwama |
| 6,012,852 A | 1/2000 | Kadar-Kallen et al. |

(Continued)

FOREIGN PATENT DOCUMENTS

| JP | H05-72444 A | 3/1993 |
| JP | 2011-059486 A | 3/2011 |

(Continued)

OTHER PUBLICATIONS

Extended European Search Report issued in corresponding European Application No. 17875277.0 dated May 4, 2020 (25 pages).

*Primary Examiner* — Sung H Pak
(74) *Attorney, Agent, or Firm* — Osha Liang LLP (57) ABSTRACT

A ferrule structure includes: a ferrule body including a guide hole that accepts insertion of a guide pin, and a fiber hole that accepts insertion of an optical fiber and that is disposed in an opening surface of the ferrule body; and a lens plate including a guide hole that accepts insertion of the guide pin, a lens part, and an abutment surface that abuts an endface of the optical fiber. A recess is disposed in at least one of the ferrule body and the lens plate. A matching material filling gap, that is to be filled with a refractive index matching material, is formed with the recess, between the opening surface of the ferrule body and the abutment surface of the lens plate.

7 Claims, 7 Drawing Sheets

(56) References Cited

U.S. PATENT DOCUMENTS

| | | | |
|---|---|---|---|
| 9,063,304 B2 | 6/2015 | Ohta et al. | |
| 9,429,717 B2* | 8/2016 | Nakama et al. | |
| 9,645,318 B2* | 5/2017 | Moriyama | G02B 6/322 |
| 10,209,455 B2* | 2/2019 | Nakama | G02B 6/36 |
| 2006/0245694 A1* | 11/2006 | Chen | G02B 6/32 |
| | | | 385/71 |
| 2013/0011100 A1 | 1/2013 | Shiraishi | |
| 2014/0133803 A1 | 5/2014 | Rosenberg et al. | |
| 2014/0166200 A1 | 6/2014 | Shiraishi | |
| 2014/0169743 A1 | 6/2014 | Hodge et al. | |
| 2014/0185990 A1 | 7/2014 | Hodge et al. | |
| 2014/0193120 A1 | 7/2014 | Hodge et al. | |
| 2014/0321814 A1 | 10/2014 | Chen et al. | |
| 2015/0370017 A1 | 12/2015 | Moriyama et al. | |
| 2016/0282562 A1* | 9/2016 | Takamizawa | G02B 6/325 |
| 2016/0341905 A1 | 11/2016 | Chen et al. | |

FOREIGN PATENT DOCUMENTS

| | | |
|---|---|---|
| JP | 2013-020027 A | 1/2013 |
| JP | 2014-517355 A | 7/2014 |
| JP | 2014-517356 A | 7/2014 |
| JP | 2014-517357 A | 7/2014 |
| JP | 5564344 B2 | 7/2014 |
| JP | 2014-521996 A | 8/2014 |
| JP | 2016-009081 A | 1/2016 |
| JP | 2016-057588 A | 4/2016 |
| JP | 2016-071195 A | 5/2016 |
| JP | 2016-184105 A | 10/2016 |
| JP | WO2016/136484 A1 | 11/2017 |
| WO | 2012/174221 A2 | 12/2012 |
| WO | 2012/174223 A2 | 12/2012 |
| WO | 2012/174227 A2 | 12/2012 |
| WO | 2013/019622 A3 | 6/2013 |

* cited by examiner

FERRULE STRUCTURE, FERRULE STRUCTURE WITH FIBER, AND METHOD FOR MANUFACTURING FERRULE STRUCTURE WITH FIBER

TECHNICAL FIELD

The present invention relates to a ferrule structure, a ferrule structure with a fiber, and a method for manufacturing a ferrule structure with a fiber.

BACKGROUND

As a ferrule that holds an end part of an optical fiber, a ferrule is known that includes an adhesive filling part provided with an opening for filling an adhesive, to fix an optical fiber by filling an adhesive in the adhesive filling part. Patent Literature 1 discloses that an endface of an optical fiber abuts an inner wall of an adhesive filling part (recess part) of a ferrule, and an adhesive fills from an opening of the adhesive filling part, and the adhesive is cured to fix the optical fiber.

Further, a configuration is known in which a ferrule body holding an end part of an optical fiber is constituted separately from a lens array. Patent Literature 2 discloses that a front surface of a ferrule body and an endface of an optical fiber are polished, and then a lens array is attached to the front surface of the ferrule body.

CITATION LIST

Patent Literature

Patent Literature 1: JP 5564344B
Patent Literature 2: JP 2014-521996A

When a ferrule is integrally constituted like the ferrule described in Patent Literature 1 and a lens is arranged in an optical path of an optical signal, three parts of a fiber hole related to a position of an endface of an optical fiber, the lens, and a guide pin hole need to be formed in a highly precise positional relationship with each other. However, in order to form all of these three parts highly precisely at the same timing, manufacturing of the ferrule is difficult, and the ferrule becomes expensive.

When a ferrule body and a lens array are separately constituted like the ferrule described in Patent Literature 2, two parts of a fiber hole and a guide pin hole may need to be highly precisely formed in the ferrule body, and two parts of a lens and a guide pin hole may be highly precisely formed in the lens array, which facilitates manufacturing of the ferrule body and the lens array. However, according to a method for manufacturing a ferrule described in Patent Literature 2, a front surface of a ferrule body and an endface of an optical fiber need to be polished, and thus a polishing step is needed.

SUMMARY

One or more embodiments of the present invention separately constitute a ferrule body and a lens array, and also allow a polishing step to be omitted, and thus achieve simplification of manufacturing steps.

One or more embodiments of the present invention is a ferrule structure including: a ferrule body including a guide hole for insertion of a guide pin, a fiber hole for insertion of an optical fiber, and an opening surface in which the fiber hole is opened; and a lens plate including a guide hole for insertion of the guide pin, a lens part, and an abutment surface for abutment of an endface of the optical fiber, wherein a recess is formed in at least one of the ferrule body and the lens plate, and a gap to be a matching material filling part that is to be filled with a refractive index matching material is formed with the recess, between the opening surface of the ferrule body and the abutment surface of the lens plate.

Other features of embodiments of the invention are made clear by the following description and the drawings.

According to one or more embodiments of the present invention, a ferrule body and a lens array are separately constituted, and a polishing step can also be omitted, and thus simplification of manufacturing steps can be achieved.

BRIEF DESCRIPTION OF DRAWINGS

FIG. 2 FIGS. 2A and 2B are exploded perspective views of the ferrule structure 1 according to one or more embodiments.

DETAILED DESCRIPTION

At least the following matters are made clear from the following description and the drawings.

A ferrule structure will become clear including: a ferrule body including a guide hole for insertion of a guide pin, a fiber hole for insertion of an optical fiber, and an opening surface in which the fiber hole is opened; and a lens plate including a guide hole for insertion of the guide pin, a lens part (lens), and an abutment surface for abutment of an endface of the optical fiber, wherein a recess is formed in at least one of the ferrule body and the lens plate, and a gap to be a matching material filling part (matching material filling gap) that is to be filled with a refractive index matching material is formed with the recess, between the opening surface of the ferrule body and the abutment surface of the lens plate. With this ferrule structure, the ferrule body and the lens array are separately constituted, and a polishing step can also be omitted, and thus simplification of manufacturing steps can be achieved.

In one or more embodiments, the recess is formed in the lens plate. In this way, it is possible to simplify a shape of the ferrule body.

In one or more embodiments, the recess is formed from an upper part to a lower part such that the matching material filling part is opened in an upper surface and a lower surface.

In this way, it is possible to facilitate a filling operation of filling a refractive index matching material in the matching material filling part.

In one or more embodiments, the abutment surface is a surface inclined to a surface perpendicular to an optical axis of the optical fiber. In this way, it is possible to suppress a loss of an optical signal.

In one or more embodiments, the ferrule body includes a plurality of the fiber holes formed in at least two rows; and the abutment surface is formed in a multistage form such that positions of endfaces of optical fibers in an optical axis direction are aligned. In this way, optical path lengths of optical signals of respective optical fibers can be identical to each other.

A ferrule structure with a fiber will become clear including: an optical fiber; a ferrule body including a guide hole for insertion of a guide pin, a fiber hole in which the optical fiber is inserted, and an opening surface in which the fiber hole is opened; and a lens plate including a guide hole for insertion of the guide pin, a lens part, and an abutment surface abutted with an endface of the optical fiber, wherein a recess is formed in at least one of the ferrule body and the lens plate, and a refractive index matching material fills a gap formed with the recess, between the opening surface of the ferrule body and the abutment surface of the lens plate. With this ferrule structure with a fiber, the ferrule body and the lens array are separately constituted, and a polishing step can also be omitted, and thus simplification of manufacturing steps can be achieved.

In one or more embodiments, the refractive index matching material is made of an adhesive; and the ferrule body and the lens plate are bonded and fixed together with the refractive index matching material filling the gap. In this way, it is possible to facilitate an operation of bonding and fixing the ferrule body and the lens plate together.

A method for manufacturing a ferrule structure with a fiber will become clear, the method including: (1) preparing a ferrule body including a guide hole for insertion of a guide pin, a fiber hole for insertion of an optical fiber, and an opening surface in which the fiber hole is opened, and a lens plate including a guide hole for insertion of the guide pin, a lens part, and an abutment surface for abutment of an endface of the optical fiber; (2) forming, with a recess formed in at least one of the ferrule body and the lens plate, a gap to be a matching material filling part between the opening surface of the ferrule body and the abutment surface of the lens plate by bringing the ferrule body into contact with the lens plate while aligning the ferrule body with the lens plate via the guide pin; (3) causing an endface of the optical fiber to abut the abutment surface of the lens plate by inserting the optical fiber into the fiber hole; and (4) filling a refractive index matching material in the matching material filling part. With this manufacturing method, the ferrule body and the lens array are separately constituted, and a polishing step can also be omitted, and thus simplification of the manufacturing steps can be achieved.

Figure 1:
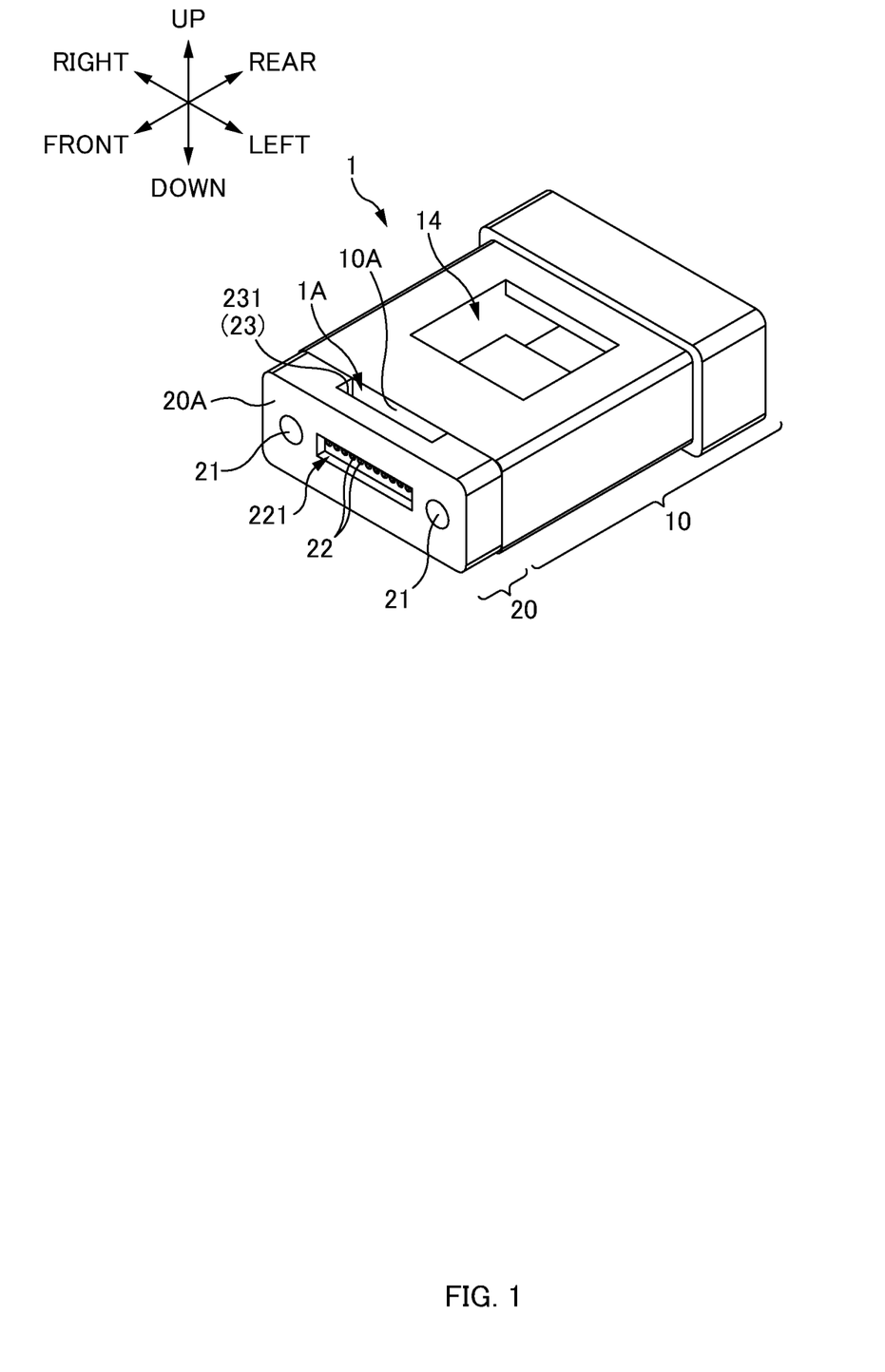
FIG. 1 is a general perspective view of a ferrule structure 1 according to one or more embodiments.
Figure 2A:
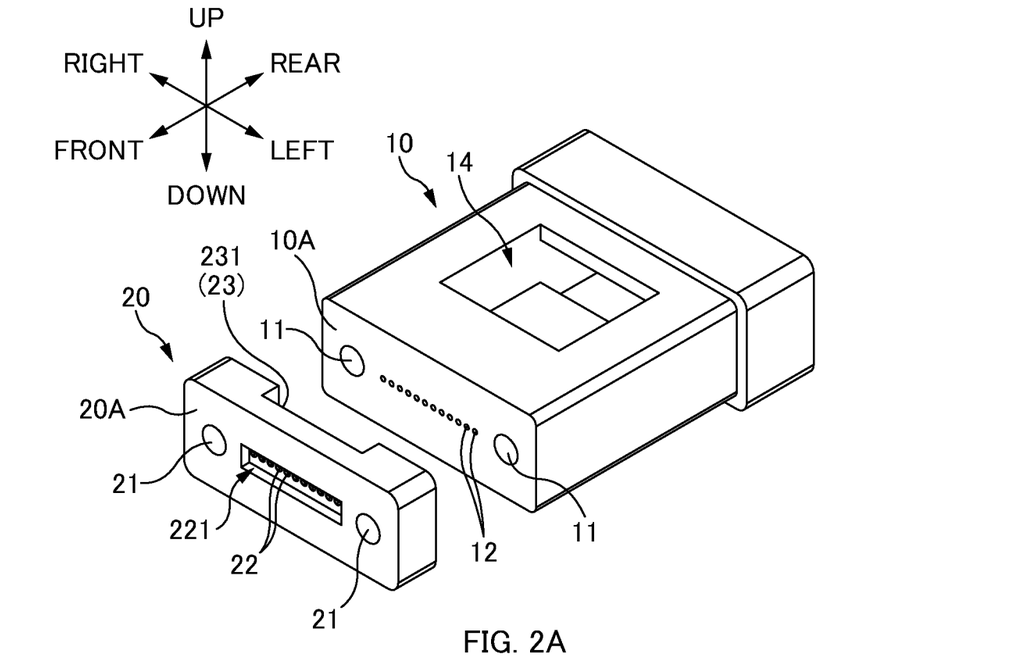
Figure 2B:
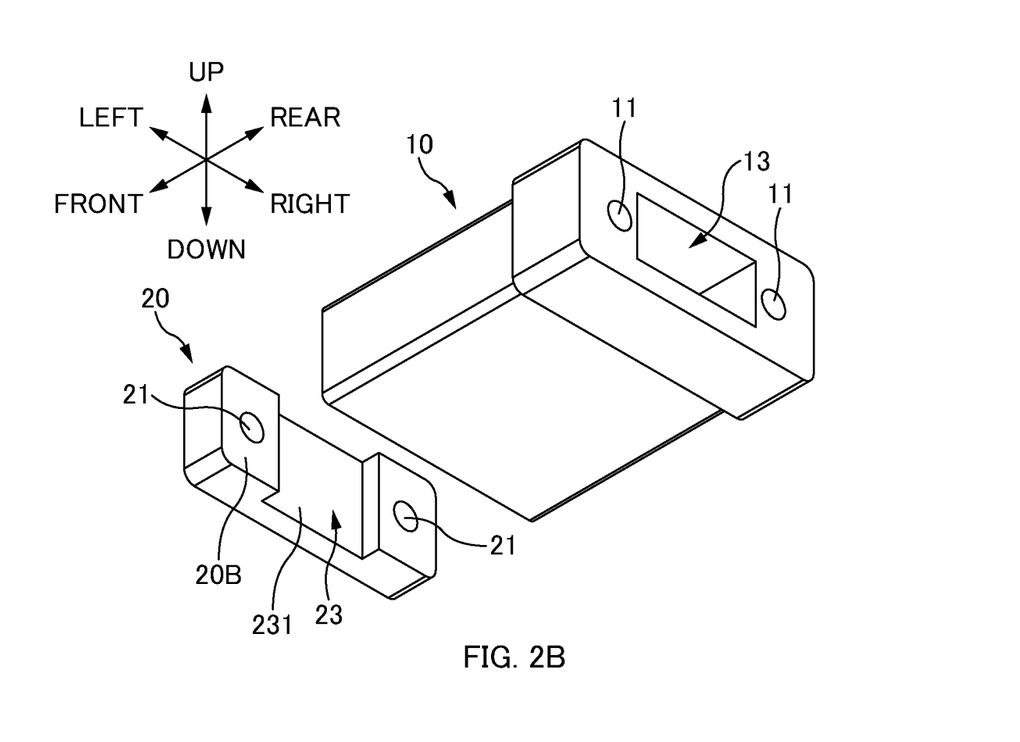

FIG. 1 is a general perspective view of a ferrule structure 1 according to one or more embodiments. FIGS. 2A and 2B are exploded perspective views of the ferrule structure 1 according to one or more embodiments.

In the following description, directions will be defined as illustrated in the drawings. Specifically, a direction of a fiber hole 12 is a "front-rear direction", an endface side of an optical fiber 3 (cf. FIGS. 4B and 4C) inserted in the fiber hole 12 (or a lens plate 20 side seen from a ferrule body 10) is "front", and an opposite side is "rear". Further, a direction in which two guide holes 21 are aligned is a "left-right direction", a right side when a front side is seen from a rear side is "right", and an opposite side is "left". Further, a direction perpendicular to the front-rear direction and the left-right direction is an "up-down direction", an opening side for filling an adhesive in an adhesive filling part 14 is "up", and an opposite side is "down".

The ferrule structure 1 is a member for holding an end part of the optical fiber 3 and optically connecting the optical fiber 3 to another optical component. The ferrule structure 1 may be simply referred to as a "ferrule". The ferrule structure 1 includes the ferrule body 10 and the lens plate 20.

The ferrule body 10 is a member that holds the end part of the optical fiber 3. The ferrule body 10 includes guide holes 11, fiber holes 12, a fiber insertion opening 13, and the adhesive filling part 14.

Note that, the ferrule body 10 has a configuration substantially similar to that of a mechanically transferable (MT) optical connector (F12 optical connector established by JIS C5981), for example. However, while a ferrule endface and an optical fiber end-face are polished in a normal MT optical connector, an optical fiber end-face protrudes from a front end surface 10A of the ferrule body 10 (opening surface of the fiber hole 12) and a ferrule endface and the optical fiber end-face are not polished in one or more embodiments, as described later. Further, while a fiber end-face is exposed from the ferrule endface in the normal MT optical connector, the optical fiber end-face is not exposed to the outside because the lens plate 20 is arranged on a front side of the ferrule body 10 and the optical fiber end-face abuts the lens plate 20 in one or more embodiments.

Each of the guide holes 11 is a hole for insertion of a guide pin (not illustrated). As described later, the guide holes 11 are also used for aligning the ferrule body 10 with the lens plate 20. The guide holes 11 penetrate the ferrule body 10 along the front-rear direction. Two guide holes 11 are opened in the front end surface 10A of the ferrule body 10. The two guide holes 11 are arranged at an interval in the left-right direction so as to sandwich a plurality of the fiber holes 12 in the left-right direction.

Figure 4A:
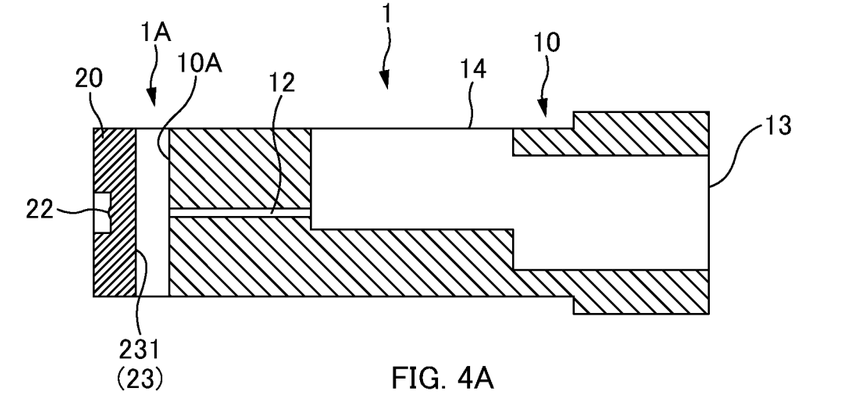
FIGS. 4A to 4C are cross-sectional explanatory views illustrating states of manufacturing steps according to one or more embodiments.
Figure 4B:
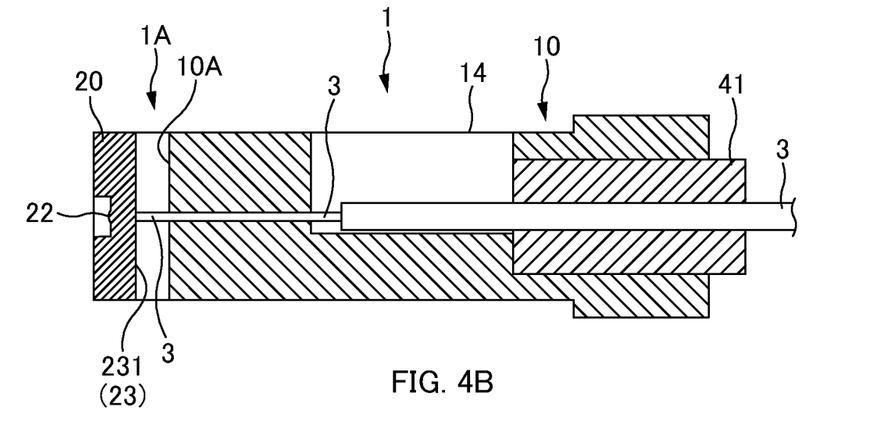
Figure 4C:
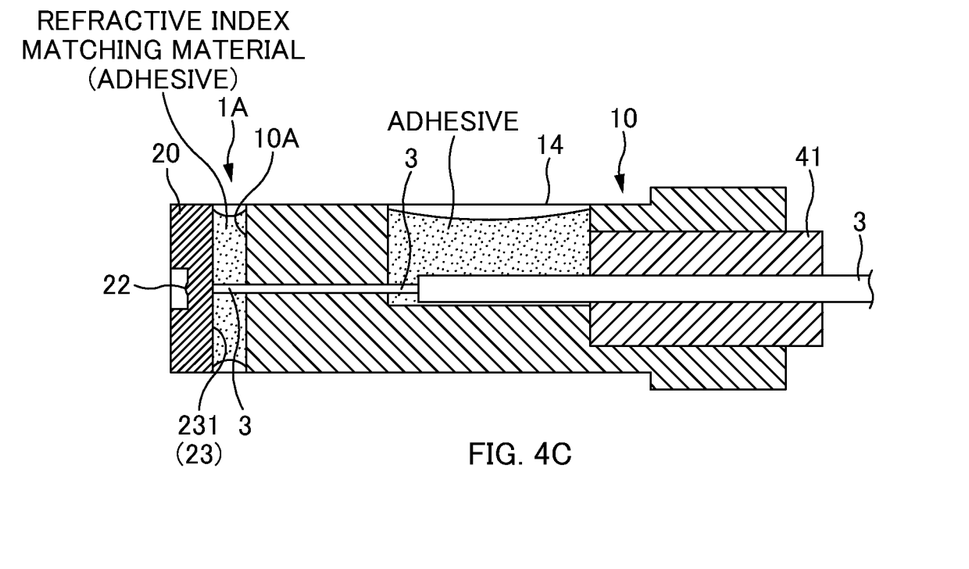

The fiber holes 12 are holes for insertion of the optical fibers 3 (cf. FIGS. 4B and 4C). The fiber holes 12 are also holes for positioning the optical fibers 3. Thus, the fiber holes 12 are highly precisely formed with respect to the guide holes 11. The fiber holes 12 penetrate between the front end surface 10A and the adhesive filling part 14. The fiber holes 12 are opened in the front end surface 10A of the ferrule body 10. A bare optical fiber in which a sheath is removed from a coated optical fiber is inserted in each fiber hole 12. The fiber holes 12 are formed along the front-rear direction.

The plurality of fiber holes 12 are formed in the ferrule body 10. The plurality of fiber holes 12 are aligned in the left-right direction. The optical fibers 3 constituting an optical fiber tape (optical fiber ribbon) are inserted in respective fiber holes 12 aligned in the left-right direction. In one or more embodiments, one row of the fiber holes 12 aligned in the left-right direction is provided. The fiber holes 12 may have one or a plurality of rows.

The fiber insertion opening 13 is an opening formed in a rear endface of the ferrule body 10. The optical fibers 3 (cf. FIGS. 4B and 4C) are to be inserted into the ferrule body 10 from the fiber insertion opening 13. A boot 41 (cf. FIGS. 4B and 4C) may be inserted in the fiber insertion opening 13, and thus the fiber insertion opening 13 may be referred to as a "boot hole".

The adhesive filling part 14 is a hollow part to be filled with an adhesive. An adhesive for keeping the optical fibers 3 in the ferrule body 10 fills the adhesive filling part 14. The adhesive fills the adhesive filling part 14, and is thus applied between inner wall surfaces of the adhesive filling part 14 and the fiber hole 12, and the optical fiber 3. This adhesive is cured to fix the optical fiber 3 to the ferrule body 10.

The lens plate 20 is an optical member including a lens array in which a plurality of lenses are aligned. The lens plate 20 is molded from transparent resin that allows transmission of an optical signal. The lens plate 20 is arranged on the front side of the ferrule body 10 while a rear end surface 20B of the lens plate 20 is in contact with the front end surface 10A of the ferrule body 10. The lens plate 20 includes the guide holes 21, lens parts 22, and a recess 23.

Each of the guide holes 21 is a hole for insertion of a guide pin (not illustrated). The guide pin is inserted in each guide hole 21, and thus ferrule structures 1 are aligned with each other. Note that, as described later, the guide holes 21 are also used for aligning the ferrule body 10 with the lens plate 20. Thus, an interval between the two guide holes 21 is the same as an interval between the two guide holes 11 of the ferrule body 10. The guide holes 21 penetrate the lens plate 20 along the front-rear direction. The two guide holes 21 are opened in each of the front end surface 20A and the rear end surface 20B of the lens plate 20.

The lens part 22 is arranged so as to correspond to each of the plurality of optical fibers 3 (in other words, the plurality of fiber holes 12), and an optical signal is input and output via the lens part 22. Thus, the lens part 22 is highly precisely formed with respect to the guide holes 21. The lens part 22 is formed so as to function as, for example, a collimating lens. A transmission loss of an optical signal can be suppressed by inputting and outputting the optical signal having a diameter magnified by the lens part 22. The lens part 22 is formed on the front end surface 20A side of the lens plate 20 and is formed in the front end surface 20A of the ferrule structure 1. The lens part 22 is formed on a bottom part of a recess part 221 of the lens plate 20 such that the protruding lens parts 22 do not contact each other when the ferrule structures 1 face and abut each other.

The recess 23 is a part for forming a gap between the opening surface of the fiber holes 12 of the ferrule body 10 and an abutment surface 231 (abutment surface 231 for abutment of the optical fiber end-faces) of the lens plate 20. In one or more embodiments, the recess 23 is formed in the rear end surface 20B of the lens plate 20. In other words, in one or more embodiments, the recess 23 is a part recessed from the rear end surface 20B of the lens plate 20. A bottom surface of the recess 23 is the abutment surface 231 for abutment of the optical fiber end-faces. Thus, when the lens plate 20 is attached to the ferrule body 10 via the guide pins (not illustrated) (described later), the bottom surface of the recess 23 being the abutment surface 231 faces the opening of the fiber holes 12 of the ferrule body 10. Note that a width in the left-right direction of the bottom surface of the recess 23 is longer than a width of the row of the fiber holes 12 aligned in the left-right direction (longer than a width of the optical fiber tape).

The recess 23 is formed in the lens plate 20, and thus a gap is formed between the lens plate 20 and the ferrule body 10, and a matching material filling part 1A is formed with the gap. In one or more embodiments, the recess 23 is formed from an upper surface to a lower surface of the lens plate 20. Thus, the matching material filling part 1A is opened in the upper surface and the lower surface of the ferrule structure 1.

The matching material filling part 1A is a hollow part to be filled with a refractive index matching material. The matching material filling part 1A is filled with an adhesive including a function as a refractive index matching material, but an adhesive may not be used as long as a refractive index matching material is used. The matching material filling part 1A is formed to be longer than a width of the optical fiber tape (optical fiber ribbon) in the left-right direction.

An upper opening of the matching material filling part 1A includes a function as an input port for inputting a refractive index matching material to the matching material filling part 1A. A lower opening of the matching material filling part 1A includes a function as an air vent for ventilation between the matching material filling part 1A and the outside. Note that the lower side of the matching material filling part 1A may not be opened, and only the upper side thereof may be opened. However, in this case, a refractive index matching material is more likely to build up on the upper side of the optical fibers 3. As a result, the refractive index matching material is less likely to reach a bottom surface of the matching material filling part 1A, and an air bubble is more likely to be formed in the matching material filling part 1A (thus, an air layer (air bubble) is more likely to be formed on the endface of the optical fiber 3, and a loss of an optical signal may be increased).

Further, as in one or more embodiments, the recess 23 is formed from the upper surface to the lower surface of the lens plate 20, and the matching material filling part 1A is configured to be opened in the upper surface and the lower surface of the ferrule structure 1. Thus, the matching material filling part 1A has a substantially vertically symmetrical structure. This results in an advantage that deformation such as a warp in the ferrule structure 1 can be suppressed when a refractive index matching material (adhesive) filling the matching material filling part 1A is cured and contracts. Note that, in a case where the matching material filling part 1A is opened only on the upper side, when a refractive index matching material (adhesive) is cured and contracts, deformation occurs on the upper side on which the matching material filling part 1A is opened in such a way as to reduce the gap between the ferrule body 10 and the lens plate 20, and deformation does not occur on the lower side. As a result, deformation may occur in such a way that the ferrule structure 1 is warped.

Figure 3:
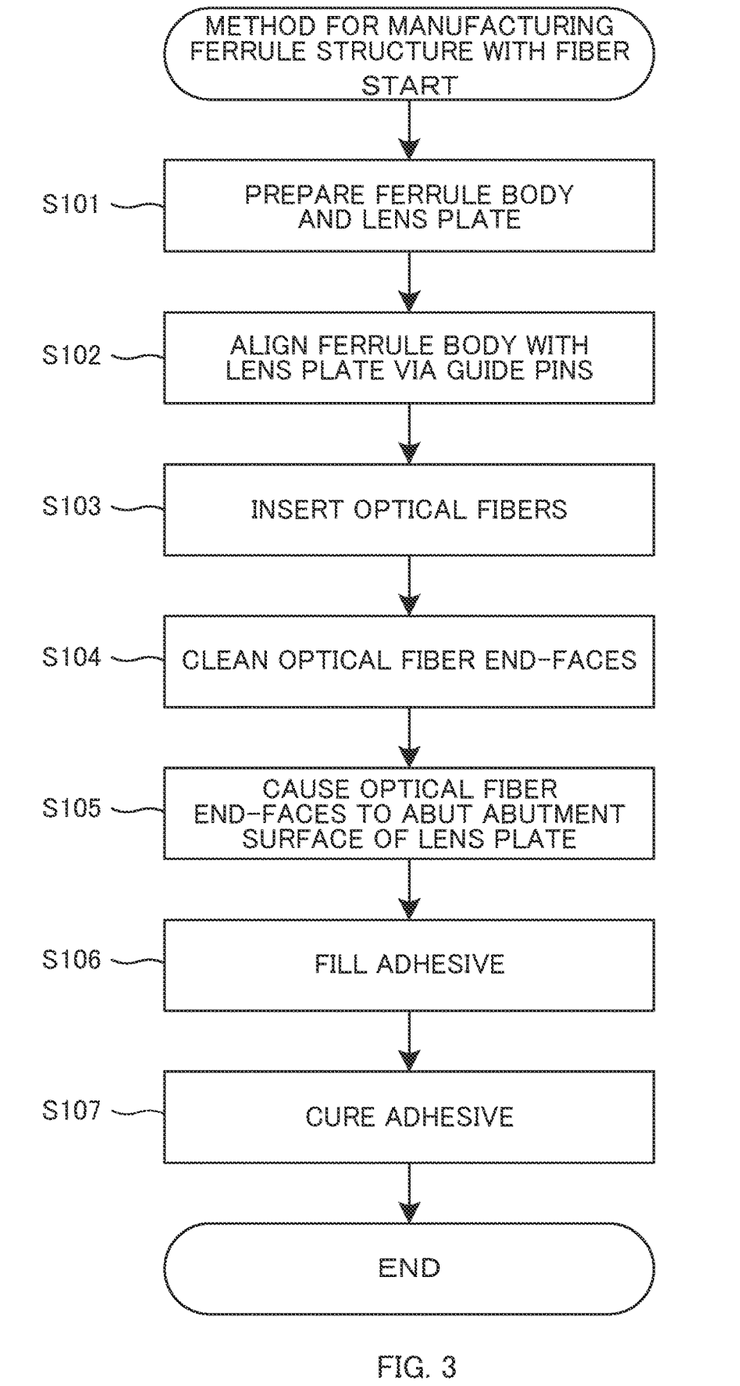
FIG. 3 is a flowchart of a method for manufacturing (a procedure for assembling) the ferrule structure 1 with a fiber.

FIG. 3 is a flowchart of a method for manufacturing (a procedure for assembling) the ferrule structure 1 with a fiber according to one or more embodiments. Further, FIGS. 4A to 4C are cross-sectional explanatory views illustrating states of respective steps according to one or more embodiments.

First, an operator prepares the ferrule body 10 and the lens plate 20 (S101). The operator also prepares the guide pins (not illustrated) for a next step. The operator also prepares a jig for assembling the ferrule body 10 and the lens plate 20 and the like as necessary.

Next, the operator aligns the ferrule body 10 with the lens plate 20 via the guide pins (S102). At this time, the operator inserts each guide pin (not illustrated) into both of the guide hole 11 of the ferrule body 10 and the guide hole 21 of the lens plate 20. In this way, the ferrule body 10 is aligned with the lens plate 20 in the up-down direction and the left-right direction. Further, the operator brings the front end surface 10A of the ferrule body 10 into contact with the rear end surface 20B of the lens plate 20 while the guide pins are inserted. In this way, the ferrule body 10 is aligned with the lens plate 20 in the front-rear direction. Note that a state where the front end surface 10A of the ferrule body 10 is in contact with the rear end surface 20B of the lens plate 20 may be maintained by placing, on a jig, the ferrule structure 1 in which the ferrule body 10 and the lens plate 20 are attached to each other via the guide pins (not illustrated).

When the ferrule body 10 is aligned with the lens plate 20 in S102, a positional relationship between the ferrule body 10 and the lens plate 20 is in a state illustrated in FIGS. 1 and 4A (note that the guide pins are not illustrated). At this time, a gap is formed between the lens plate 20 and the ferrule body 10 with the recess 23 of the lens plate 20, and the matching material filling part 1A is formed with the gap. The bottom surface (abutment surface 231) of the recess 23 of the lens plate 20 faces the openings of the fiber holes 12 of the ferrule body 10.

Next, the operator inserts each of the optical fibers 3 of the optical fiber tape into each of the fiber holes 12 of the ferrule body 10 (S103). Then, the optical fiber 3 protrudes from the front end surface 10A (opening surface of the fiber hole 12) of the ferrule body 10. However, in this stage, the optical fiber end-face does not abut the abutment surface 231 (bottom surface of the recess 23) of the lens plate 20. This is because dust and the like may adhere to the optical fiber end-face when the optical fiber 3 passes through the fiber hole 12.

Next, the operator cleans the optical fiber end-face (S104). For example, the operator blows air onto the gap of the matching material filling part 1A, and blows off dust adhering to the optical fiber end-face protruding from the front end surface 10A of the ferrule body 10. In this way, dust adhering on the optical fiber end-face when the optical fiber 3 is inserted into the fiber hole 12 (S103) can be removed. Note that the cleaning processing in S104 is performed before S105 (abutment processing) and S106 (adhesive filling processing) in order to remove dust on the optical fiber end-face in such a manner.

Next, the operator further inserts the optical fiber 3, and causes the optical fiber end-face to abut the abutment surface 231 of the lens plate 20 (105). In this stage, strictly speaking, an air layer may exist between the optical fiber end-face and the abutment surface 231. Note that, as illustrated in FIG. 4B, the operator inserts the boot 41 into the fiber insertion opening 13 in one or more embodiments. However, the boot 41 may not be inserted into the fiber insertion opening 13.

Next, the operator fills an adhesive (S106).

In the adhesive filling processing in S106, first, the operator fills the adhesive in the adhesive filling part 14 of the ferrule body 10. In this way, the adhesive is applied between the inner wall surface of the adhesive filling part 14 and the optical fiber 3. Further, when the adhesive fills the adhesive filling part 14, the adhesive permeates between the inner wall surface of the fiber hole 12 and the optical fiber 3. When the adhesive sufficiently permeates, the adhesive filling the adhesive filling part 14 leaks from the front end surface 10A (opening of the fiber hole 12) of the ferrule body 10. In one or more embodiments, a leak of the adhesive filling the adhesive filling part 14 from the front end surface 10A (openings of the fiber hole 12) of the ferrule body 10 is visible through a gap of the recess 23 (matching material filling part 1A) of the lens plate 20. The operator fills an adhesive to be a refractive index matching material in the matching material filling part 1A after recognizing a leak of the adhesive filling the adhesive filling part 14 from the front end surface 10A (opening of the fiber hole 12) of the ferrule body 10. This can suppress an air bubble remaining in the fiber hole 12.

The operator fills the adhesive to be the refractive index matching material from the upper opening of the matching material filling part 1A. At this time, the refractive index matching material fills above the optical fibers 3 in the matching material filling part 1A, and then fills below the optical fibers 3 through a gap between the optical fibers 3, and permeates between the optical fiber end-face and the abutment part. At this time, the lower opening of the matching material filling part 1A functions as an air vent, and thus the refractive index matching material is more likely to reach the lower side of the optical fibers 3 and less likely to build up on the upper side of the optical fibers 3. Accordingly, filling time needed to fill the refractive index matching material in the matching material filling part 1A can be shortened.

When the adhesive to be the refractive index matching material fills the matching material filling part 1A in S106, the adhesive permeates through a minute gap between contact surfaces of the ferrule body 10 and the lens plate 20. In this way, when the adhesive is cured in next processing, the ferrule body 10 and the lens plate 20 can be bonded and fixed together. This facilitates an operation of bonding and fixing the ferrule body 10 and the lens plate 20 together.

Next, the operator cures the adhesive (S107). When an ultraviolet curing resin is used as the adhesive, the operator applies ultraviolet rays. Alternatively, when an ultraviolet curing resin is used as the adhesive, the operator applies heat.

Figure 5:
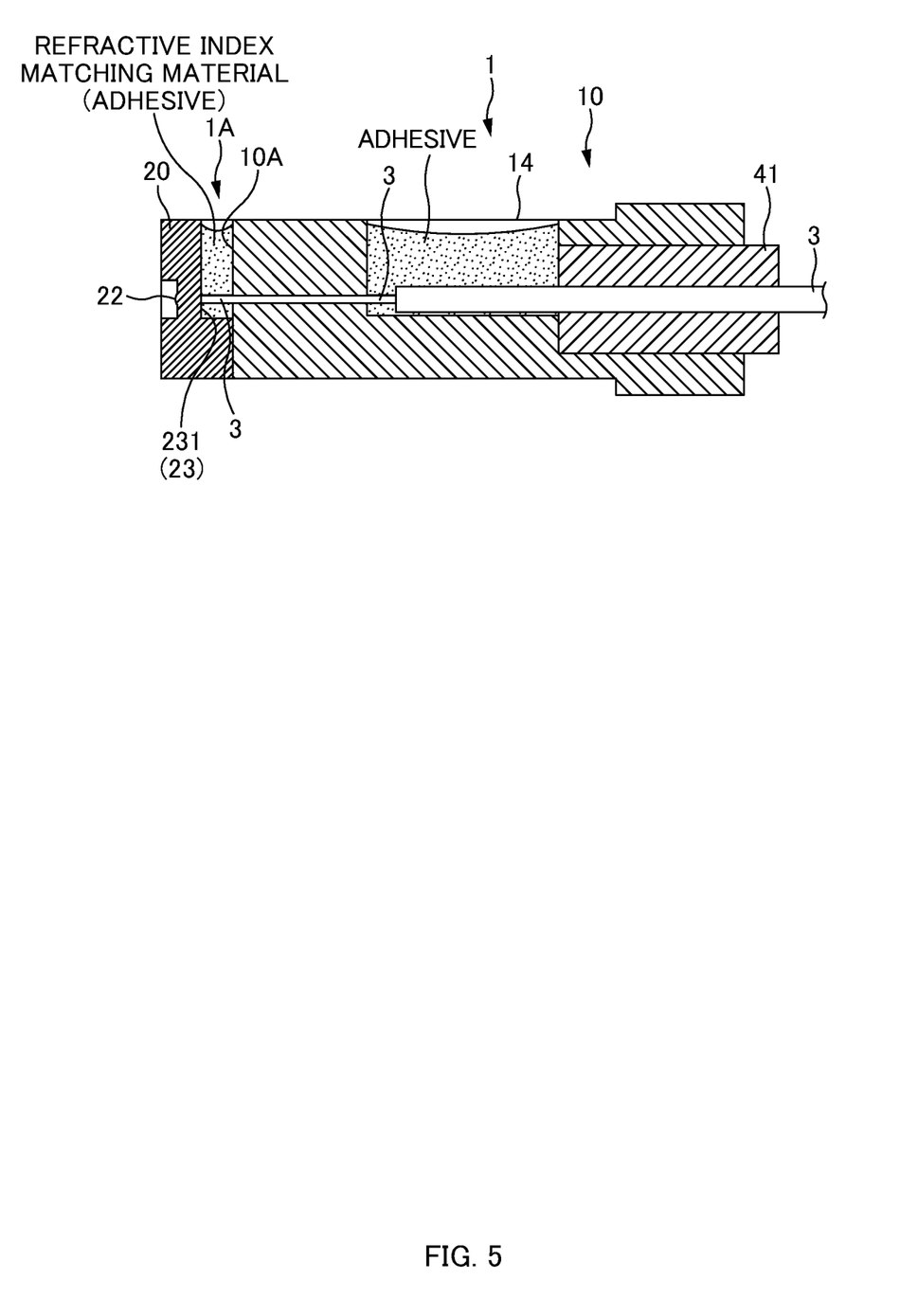
FIG. 5 is a cross-sectional explanatory view of the ferrule structure 1 according to one or more embodiments of a first modified example.

FIG. 5 is a cross-sectional explanatory view of the ferrule structure 1 according to one or more embodiments of a first modified example. In the above-described embodiments, the recess 23 is formed from the upper surface to the lower surface of the lens plate 20, and the matching material filling part 1A is opened in the upper surface and the lower surface of the ferrule structure 1. In contrast, in the first modified example, the recess 23 is formed only in an upper part of the lens plate 20, and the matching material filling part 1A is opened only in the upper surface of the ferrule structure 1.

Figure 6A:
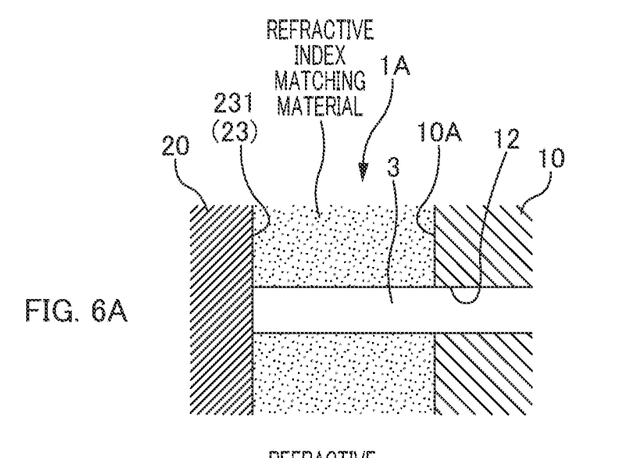
FIG. 6A is an explanatory view of a vicinity of an optical fiber end-face according to one or more embodiments.

FIG. 6A is an explanatory view of a vicinity of the optical fiber end-face according to the above-described embodiments. As illustrated in FIG. 6A, the abutment surface 231 of the lens plate 20 is a surface perpendicular to an optical axis (front-rear direction) of the optical fiber 3 in the above-described embodiments. However, in this case, a loss of an optical signal is more likely to occur due to reflection of the optical signal on the abutment surface 231.

Figure 6B:
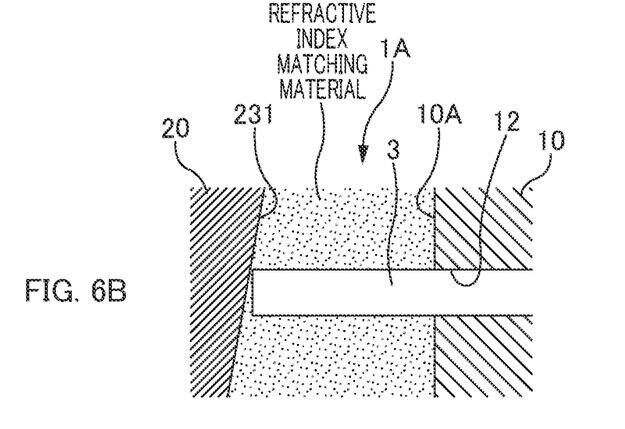
FIG. 6B is an explanatory view of one or more embodiments of a second modified example.

FIG. 6B is an explanatory view of one or more embodiments of a second modified example. As illustrated in FIG. 6B, the abutment surface 231 of the lens plate 20 is inclined to a surface perpendicular to the optical axis of the optical fiber 3 in the second modified example. For example, the abutment surface 231 in FIG. 6B is inclined by about 8 degrees to the abutment surface 231 in FIG. 6A (the surface perpendicular to the optical axis of the optical fiber 3). This can suppress reflection of an optical signal on the abutment surface 231, and suppress a loss of the optical signal. Note that, when the abutment surface 231 is inclined, an optical signal is refracted by the abutment surface 231, and thus a position in the up-down direction of each unit such as the fiber hole 12 with respect to the guide hole may be appropriately changed.

Figure 6C:
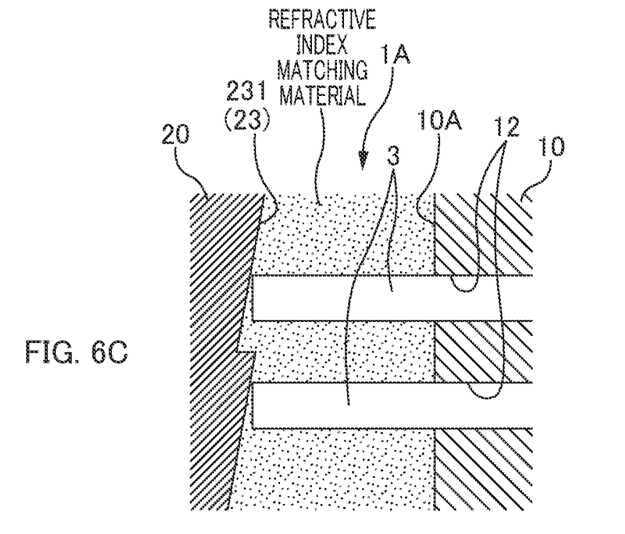
FIG. 6C is another explanatory view of one or more embodiments of the second modified example.

FIG. 6C is another explanatory view of one or more embodiments of the second modified example. In the above-described embodiments, the fiber holes 12 of the ferrule body 10 are formed in one row, but the fiber holes 12 may be formed in two rows as illustrated in FIG. 6C. When the optical fiber end-faces abut a single inclined abutment surface 231 in such a case, a position of an upper optical fiber end-face in the front-rear direction is different from a position of a lower optical fiber end-face in the front-rear direction, and thus an optical path length of an optical signal incident on and emitted from an upper optical fiber 3 (particularly, an optical path length from the optical fiber end-face to the lens part 22) is different from an optical path length of an optical signal incident on and emitted from a lower optical fiber 3. Thus, as illustrated in FIG. 6C, the abutment surface 231 being inclined may be formed in a multistage form by providing a step such that positions in the front-rear direction of endfaces of the optical fibers 3 arranged on the upper side and the lower side are aligned. In this way, the optical path lengths of the optical signals incident on and emitted from the optical fibers 3 arranged on the upper side and the lower side can be identical to each other.

The above-described ferrule structure 1, in accordance with one or more embodiments, includes the ferrule body 10 and the lens plate 20. The ferrule body 10 includes the guide hole (s) 11, the fiber hole (s) 12, and the opening surface (front end surface 10A) in which the fiber hole (s) 12 is opened. The lens plate 20 includes the guide hole(s) 21, the lens part (s) 22, and the abutment surface 231 for abutment of the optical fiber end-face (s). In one or more embodiments, the recess 23 is formed in the lens plate 20, and a gap to be the matching material filling part 1A is formed with this recess 23, between the front end surface 10A (opening surface in which the fiber hole(s) 12 is opened) of the ferrule body 10 and the abutment surface 231 of the lens plate 20. With this ferrule structure 1 according to one or more embodiments, the ferrule body 10 and the lens plate 20 can be constituted separately, and thus two parts of the guide hole (s) 11 and the fiber hole (s) 12 may be highly precisely formed in the ferrule body 10, and two parts of the guide hole (s) 21 and the lens part 22 may be highly precisely formed in the lens plate 20. This facilitates manufacturing of the ferrule body 10 and the lens plate 20. Further, with the ferrule structure 1 according to one or more embodiments, the optical fiber end-face may abut the abutment surface 231 and then the refractive index matching material may fill the matching material filling part 1A, and thus a polishing step of polishing the ferrule body 10 and the optical fiber end-face can be omitted. Accordingly, simplification of manufacturing steps can be achieved.

Further, with the ferrule structure 1 according to one or more embodiments, the recess 23 is formed in the lens plate 20. If a recess is formed in the ferrule body 10, the recess is formed in the opening surface of the fiber hole (s) 12 that requires high positional precision, and thus molding of the ferrule body 10 is difficult. On the other hand, a shape of the ferrule body 10 can be simplified in one or more embodiments, and thus there is an advantage that resin molding of the ferrule body 10 is easy.

In the above-described embodiments, by forming the recess 23 in the lens plate 20, a gap to be the matching material filling part 1A is formed between the opening surface of the fiber holes 12 of the ferrule body 10 and the abutment surface 231 of the lens plate 20. However, by forming a recess 15 in the ferrule body 10, a gap to be the matching material filling part 1A may be formed between the opening surface of the fiber holes 12 of the ferrule body 10 and the abutment surface of the lens plate 20.

Figure 7A:
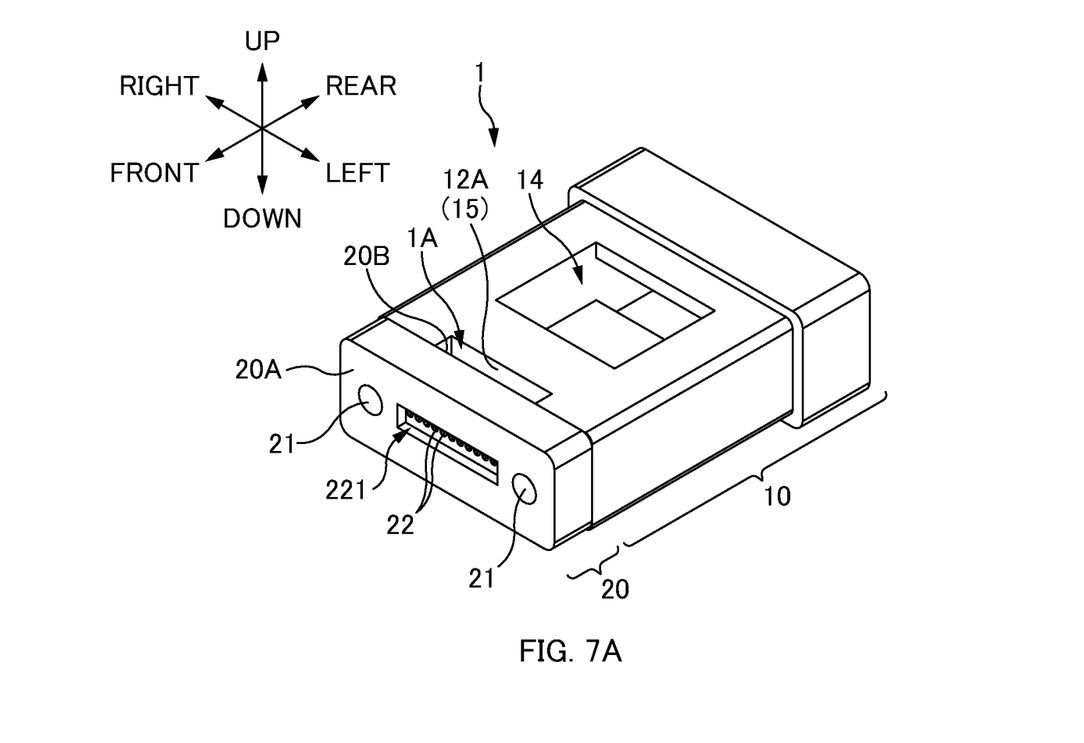
FIG. 7A is a general perspective view of a ferrule structure 1 according to one or more embodiments.
Figure 7B:
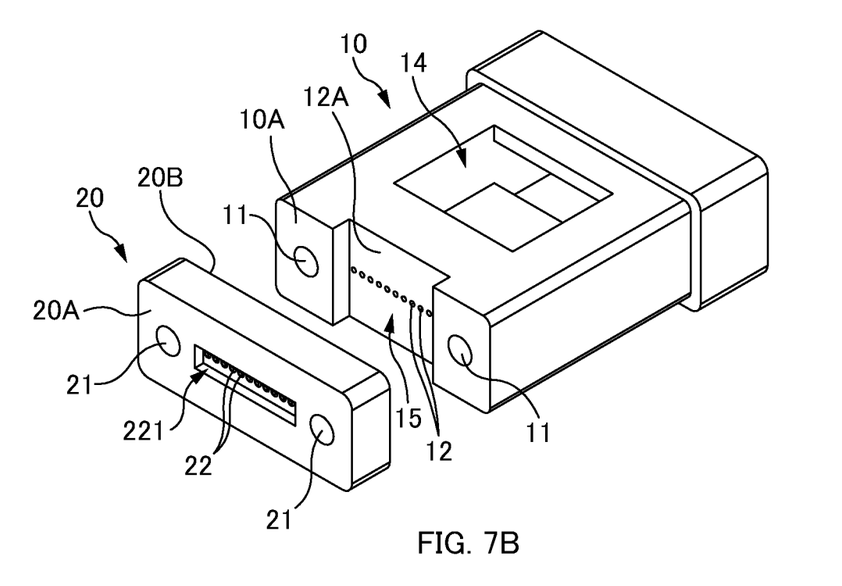
FIG. 7B is an exploded perspective view of the ferrule structure 1 according to one or more embodiments.

FIG. 7A is a general perspective view of a ferrule structure 1 according to one or more embodiments. FIG. 7B is an exploded perspective view of the ferrule structure 1 according to one or more embodiments.

A ferrule body 10 includes guide holes 11, fiber holes 12, a fiber insertion opening 13, and an adhesive filling part 14, similarly to the above-described embodiments, and also includes the recess 15.

The recess 15 of the ferrule body 10 according to one or more embodiments is a part for forming a gap between opening surface of the fiber holes 12 of the ferrule body 10 and an abutment surface 20B of the lens plate 20, similarly to the recess 23 of the lens plate 20 in the above-described embodiments. In one or more embodiments, the recess 15 is formed in a front end surface 10A of the ferrule body 10. In other words, in one or more embodiments, the recess 15 is a part recessed from the front end surface 10A of the ferrule body 10. A bottom surface of the recess 15 is the opening surface in which the fiber holes 12 are opened. Thus, when the lens plate 20 is attached to the ferrule body 10 via guide pins (not illustrated) (cf. FIG. 7A), the bottom surface of the recess 15 being the opening surface of the fiber holes 12 faces a rear end surface 20B of the lens plate 20 to be an abutment surface for optical fibers 3. Note that, also in one or more embodiments, a width in the left-right direction of the bottom surface of the recess 15 is longer than a width of the row of the fiber holes 12 aligned in the left-right direction (longer than a width of the optical fiber tape).

The recess 15 is formed in the ferrule body 10, and thus a gap is formed between the ferrule body 10 and the lens plate 20, and a matching material filling part 1A is formed with this gap. In one or more embodiments, the recess 15 is formed from an upper surface to a lower surface in the front end surface 10A of the ferrule body 10. Thus, also in one or more embodiments, the matching material filling part 1A is opened in an upper surface and a lower surface of the ferrule structure 1. However, the recess 15 may be formed only in an upper part of the ferrule body 10, and the matching material filling part 1A may be opened only in the upper surface of the ferrule structure 1.

Since the ferrule body 10 and the lens plate 20 can also be constituted separately in one or more embodiments described above, two parts of the guide holes 11 and the fiber holes 12 may be highly precisely formed in the ferrule body 10, and two parts of guide holes 21 and a lens part 22 may be highly precisely formed in the lens plate 20. This facilitates manufacturing of the ferrule body 10 and the lens plate 20. Also, in one or more embodiments, since an optical fiber end-face may abut the abutment surface 231 and then a refractive index matching material may fill the matching material filling part 1A, a polishing step of polishing the ferrule body 10 and the optical fiber end-face can be omitted. Accordingly, simplification of manufacturing steps can be achieved.

Note that a recess may be formed in both of the ferrule body 10 and the lens plate 20 instead of being formed in only one of the ferrule body 10 and the lens plate 20. Even in such a case, a gap is formed between the ferrule body 10 and the lens plate 20, and the matching material filling part 1A can be formed with the gap.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Ferrule structure;
1A: Matching material filling part (matching material filling gap);
3: Optical fiber;
10: Ferrule body;
10A: Front end surface;
11: Guide hole;

12: Fiber hole;
13: Fiber insertion opening;
14: Adhesive filling part;
15: Recess;
20: Lens plate;
20A: Front end surface;
20B: Rear end surface (abutment surface in one or more embodiments);
21: Guide hole;
22: Lens part (lens);
221: Recess part;
23: Recess;
231: Abutment surface;
41: Boot.

The invention claimed is:

1. A ferrule structure comprising:
a ferrule body comprising:
a guide hole that accepts insertion of a guide pin; and
a fiber hole that accepts insertion of an optical fiber and that is disposed in an opening surface of the ferrule body; and
a lens plate comprising:
a guide hole that accepts insertion of the guide pin;
a lens; and
an abutment surface that abuts an endface of the optical fiber, wherein
a recess is disposed in at least one of the ferrule body and the lens plate,
a matching material filling gap, that is to be filled with a refractive index matching material, is formed with the recess, between the opening surface of the ferrule body and the abutment surface of the lens plate, and
the recess is formed from an upper surface to a lower surface of the at least one of the ferrule body and the lens plate such that the matching material filling gap is opened in an upper surface and a lower surface of the ferrule structure.

2. The ferrule structure according to claim 1, wherein the recess is disposed in the lens plate.

3. The ferrule structure according to claim 1, wherein the abutment surface is inclined with respect to a surface that is perpendicular to an optical axis of the optical fiber.

4. The ferrule structure according to claim 3, wherein
the ferrule body includes a plurality of the fiber holes disposed in at least two rows and accepts a plurality of optical fibers, and
the abutment surface comprises a multistage form such that positions of endfaces of the plurality of the optical fibers in an optical axis direction are aligned.

5. A ferrule structure with a fiber comprising:
an optical fiber;
a ferrule body comprising:
a guide hole that accepts insertion of a guide pin; and
a fiber hole in which the optical fiber is inserted and that is disposed in an opening surface of the ferrule body; and
a lens plate comprising:
a guide hole that accepts insertion of the guide pin;
a lens; and
an abutment surface that abuts an endface of the optical fiber, wherein
a recess is disposed in at least one of the ferrule body and the lens plate,
a refractive index matching material fills a matching material filling gap formed with the recess, between the opening surface of the ferrule body and the abutment surface of the lens plate, and
the recess is formed from an upper surface to a lower surface of the at least one of the ferrule body and the lens plate such that the matching material filling gap is opened in an upper surface and a lower surface of the ferrule structure.

6. The ferrule structure with a fiber according to claim 5, wherein
the refractive index matching material comprises an adhesive, and
the ferrule body and the lens plate are bonded and fixed together with the refractive index matching material that fills the matching material filling gap.

7. A method for manufacturing a ferrule structure with a fiber, wherein the ferrule structure comprises: a ferrule body comprising a guide hole that accepts insertion of a guide pin and a fiber hole that accepts insertion of an optical fiber and that is disposed in an opening surface of the ferrule body; and a lens plate comprising a guide hold that accepts insertion of the guide pin, a lens, and an abutment surface that abuts an endface of the optical fiber, the method comprising:
forming, with a recess disposed in at least one of the ferrule body and the lens plate, a matching material filling gap between the opening surface of the ferrule body and the abutment surface of the lens plate by bringing the ferrule body into contact with the lens plate while aligning the ferrule body with the lens plate via the guide pin;
causing an endface of the optical fiber to abut the abutment surface of the lens plate by inserting the optical fiber into the fiber hole; and
filling the matching material filling gap with a refractive index matching material, wherein
the recess is formed from an upper surface to a lower surface of the at least one of the ferrule body and the lens plate such that the matching material filling gap is opened in an upper surface and a lower surface of the ferrule structure.

* * * * *